United States Patent
Agner

(10) Patent No.: US 8,528,714 B2
(45) Date of Patent: Sep. 10, 2013

(54) CLUTCH ARRANGEMENT, IN PARTICULAR WET-RUNNING DUAL CLUTCH ARRANGEMENT

(75) Inventor: Ivo Agner, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 416 days.

(21) Appl. No.: 12/650,623

(22) Filed: Dec. 31, 2009

(65) Prior Publication Data

US 2010/0101912 A1 Apr. 29, 2010

Related U.S. Application Data

(63) Continuation of application No. PCT/DE2008/000940, filed on Jun. 5, 2008.

(30) Foreign Application Priority Data

Jul. 2, 2007 (DE) .......................... 10 2007 030 723

(51) Int. Cl.
*F16D 25/0638* (2006.01)
*F16D 25/10* (2006.01)
*F16D 25/12* (2006.01)

(52) U.S. Cl.
USPC .................. 192/48.619; 192/85.24; 192/85.43

(58) Field of Classification Search
USPC .................. 192/48.618, 48.619, 85.24, 85.43
See application file for complete search history.

(56) References Cited

U.S. PATENT DOCUMENTS

| | | | |
|---|---|---|---|
| 3,494,452 A | 2/1970 | Finkin | |
| 3,970,176 A * | 7/1976 | Bucksch | ................. 192/48.618 |
| 2007/0170034 A1* | 7/2007 | Metzinger et al. | ......... 192/70.12 |
| 2007/0193843 A1* | 8/2007 | Uhler et al. | .................. 192/48.8 |
| 2007/0221468 A1* | 9/2007 | George et al. | .............. 192/87.11 |

FOREIGN PATENT DOCUMENTS

| | | |
|---|---|---|
| DE | 102 55 537 A | 6/2004 |
| DE | 10 2006 026 373 | 1/2007 |
| EP | 1 698 799 | 9/2006 |
| JP | 2-17233 * | 1/1990 |

* cited by examiner

*Primary Examiner* — Rodney Bonck
(74) *Attorney, Agent, or Firm* — Lucas & Mercanti, LLP

(57) ABSTRACT

A clutch arrangement of disc-type design, which has two clutch parts that have at least one element which forms a surface of a friction pairing and which bears friction surfaces. The clutch parts can be operatively connected to one another by an actuating device, which has a pressure element. The actuating force, which acts on the clutch parts, is supported centrally on a support surface which is situated opposite the effective piston surface and which is aligned in the direction of the piston surface. The final element, which forms a surface of a friction pairing, in the line of action of the actuating force has a thickness which is smaller than the thickness of the other elements.

17 Claims, 3 Drawing Sheets

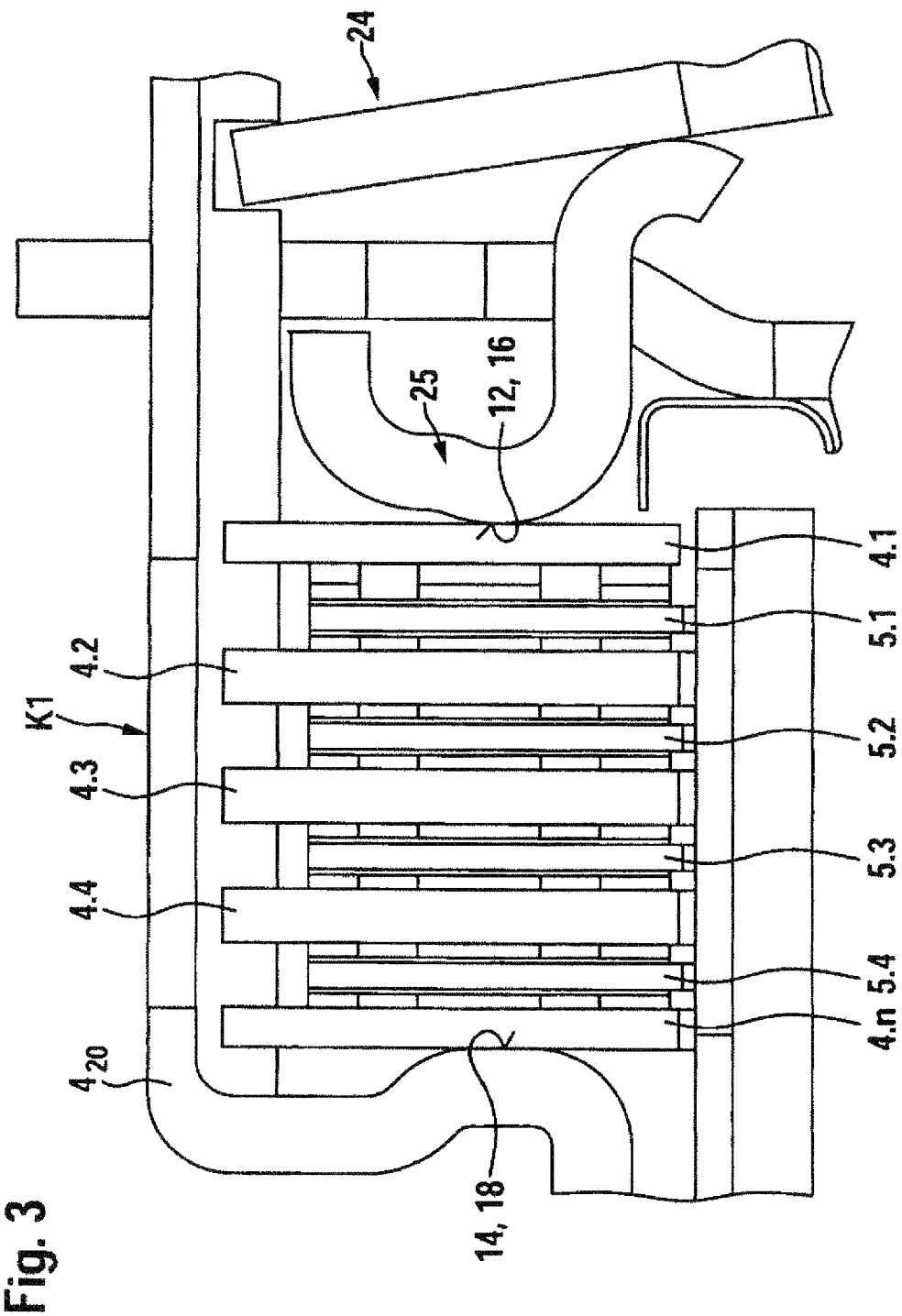

CLUTCH ARRANGEMENT, IN PARTICULAR WET-RUNNING DUAL CLUTCH ARRANGEMENT

This application is a continuation application of PCT/DE2008/000940 filed Jun. 5, 2008, which in turn claims the priority of DE 10 2007 030 723.5, filed Jul. 2, 2007, the priority of these applications is hereby claimed and these applications are incorporated by reference herein.

FIELD OF THE INVENTION

The invention relates to a clutch arrangement of disk-type design, comprising two clutch parts which have at least one friction-surface-bearing element, which clutch parts can be brought into operative connection with one another by means of an actuating device, the actuating force which acts on the clutch parts being supported centrally on a support surface.

BACKGROUND OF THE INVENTION

A plurality of embodiments of clutch arrangements are known from the prior art. Frictional clutch arrangements are predominantly of plate-type design. This means that the clutch arrangement comprises a first clutch part and a second clutch part, each clutch part having at least one friction-surface-bearing element. The individual clutch parts are brought into operative connection with one another by means of an actuating device. This is generally accomplished by means of a piston element, which exerts a contact force on the two clutch parts and thus brings the friction-surface-bearing elements into operative connection with one another. Here, the piston element generally acts directly on an end plate arranged on the piston side, it being possible for this end plate to be a component part of an outer or an inner plate carrier. On the other side of the clutch arrangement, the contact force is supported on the last plate in the direction in which the force acts, which is referred to as the end plate, this plate being supported, in turn, on a stop situated in an axially fixed location on a connection element on the clutch carrier or in the housing. In the simplest case, support is provided directly on the plate carrier, which also carries the respective end plate. The friction-surface-bearing elements of one clutch part are formed by steel plates, which can be brought into operative connection with other friction-surface-forming elements of the other clutch part. These can be provided with an additional friction lining or can merely define the possible surface areas for a friction pairing with their faces. Here, the end plates are configured in such a way that they have the required heat capacity and are also capable of compensating for the forces acting directly on them, in particular the supporting force and the actuating force. In contrast to the intermediate plates arranged between them, the end plates are therefore often embodied with at least the same thickness or a greater thickness. The individual clutch arrangement is therefore relatively large overall in the axial direction.

The object on which the invention is based is therefore to develop a clutch arrangement of the type stated at the outset in such a way that a potential reduction in the temperatures in the region of frictional contact with, at the same time, uniform distribution of surface pressure and a shorter overall axial length or the same overall axial length as in the prior art are achieved. The solution according to the invention should be distinguished by a low level of design complexity and a low outlay in terms of manufacture.

SUMMARY OF THE INVENTION

The solution, according to the invention, is characterized by a clutch arrangement, in particular of disk-type or plate-type design, has at least one first clutch part, which has at least one and preferably a plurality of elements, in particular friction-surface-bearing elements, which form one surface of a friction pairing, and a second clutch part, comprising at least one and preferably a plurality of elements, in particular friction-surface-bearing elements, which form the other surfaces of the friction pairings in each case. The two clutch parts can be brought into operative connection with one another by means of an actuating device, thereby producing a frictional engagement between the friction-surface-bearing elements. "Friction surfaces" is understood to mean those surface areas which together form the friction pairing for the purpose of producing a force-type engagement or frictional engagement. An actuating force is introduced by means of the actuating device. Means for supporting the clutch arrangement in relation to the actuating force are furthermore provided. The contact force on the end plates is preferably introduced centrally. This means that the actuating force on the end plate remote from the actuating device, which is generally designed as a piston element, is supported centrally. The support surface of the means for producing a supporting force is arranged centrally relative to the friction-surface area of the end plate. According to the invention, the thickness of this end plate is considerably reduced, it being possible as a result for the latter to have the same thickness or a smaller thickness than the intermediate plates. The inventors have realized that the principal design criterion for the friction-surface-bearing elements which are arranged between the end plates is the required heat capacity for gearshift and starting operations. Owing to the fact that the intermediate plates are subject to frictional heat on both sides, higher temperatures are produced in these frictional contacts during a gearshift operation than is the case with end plates of the same thickness, where heat is introduced from one side only. However, since the thickness of the end plates depends not only on the required heat capacity but also on the elasticity required to achieve uniform distribution of surface pressure in the case of eccentric force support, and central force support ensures uniform distribution of surface pressure, thinner end plates also meet these requirements. The overall axial length and costs can thereby be reduced and, furthermore, the maximum temperatures at the frictional contact can be lowered for the same overall axial length of the plate assembly as in the prior art, and in this way the life of the lining and of the transmission oil can be considerably lengthened.

There are a number of possibilities as regards the design of the support surface. It can be formed by a part of the clutch arrangement, in particular the clutch part itself, e.g. a driver unit carrying the plate carriers of the first clutch parts, by an element connected in a rotatably fixed manner to said driver unit, or by the plate carrier. It is furthermore also conceivable to use the housing or some other wall, e.g. that of the transmission, for this purpose. According to a particularly advantageous embodiment, the support surface is preferably formed directly by one of the plate carriers or an element coupled in a rotatably fixed manner to the latter. This has the advantage that no frictional work occurs here owing to the absence of relative motion between the support surface and the end plate. In the simplest case, the support is constructed by forming the plate carrier in an axial direction, e.g. in the form of a continuous bead running around in a circumferential direction, which can be formed in a relatively simple manner. Any other type of projection that forms a support surface would also be conceivable.

According to an advantageous development for optimum support of the actuating force, the pressure element, in particular piston element, is embodied in such a way that the effective pressure surface, in particular piston surface, which is effective on the outer end plate, situated opposite the end plate on the support-surface side, i.e. the end or input plate on the piston side, is aligned so as to face in the opposite direction to the support surface and furthermore is preferably situated directly opposite said surface, i.e. is without an offset in a radial direction.

According to a particularly advantageous development, the effective pressure or piston surface and the support surface, which are in the form of annular surfaces running around in a circumferential direction, are of equal size. This means that they can preferably be described by the same diameters. This provides optimum conditions for uniform surface pressure over the entire friction surface of the individual disk-shaped elements, in particular plates, of the clutch parts.

The actuating force and the support surface are preferably effective on the same clutch part since unambiguous geometrical association is possible here in a simple manner. However, it would also be conceivable to form the piston-side end plate from the other clutch part.

The solution according to the invention can be used in clutches in the form of dual clutch arrangements, and with very particular preference in wet-running dual clutch arrangements. These are characterized by two clutch arrangements arranged one inside the other in a radial direction and without an offset or with only a slight offset in an axial direction. Here, each of the individual clutch arrangements is assigned an actuating device. According to the invention, preferably at least one, namely the radially outer clutch arrangement, which is of stronger design and which serves to transmit higher torques than the radially inner clutch arrangement, is embodied with central support and thinner end plates. This makes it possible for the clutch width, i.e. its extent in an axial direction, not to exceed the extent of the second, radially inner clutch arrangement. By virtue of this solution, it is possible to create even dual clutch arrangements which are as small as possible in terms of their overall axial length. According to a particularly advantageous development, both clutch arrangements are embodied with central support, i.e. they have corresponding central support on the respective clutch part. This makes it possible to achieve a corresponding reduction in the installation space required for both clutch arrangements, and it is also possible, by appropriate design of the housing, for example, to use the additional installation space obtained in the region of the second, radially inner clutch arrangement for other assemblies as well.

According to a particularly advantageous embodiment of the invention, the thickness d of the end plate is just 85%—preferably 90%—of the thickness of the intermediate plates. With a steel-plate thickness of 2 mm, the end plate is then about 0.3 mm thinner.

The solution according to the invention can be used independently of the principle of operation of the individual clutch arrangement. The piston surface can be brought into contact by translation or tilting.

BRIEF DESCRIPTION OF THE DRAWINGS

The solution according to the invention is explained below with reference to figures. In the figures, the following features are illustrated in particular:

FIG. 3 illustrates a detail view corresponding to FIG. 2.

DETAILED DESCRIPTION OF THE INVENTION

Figure 1:
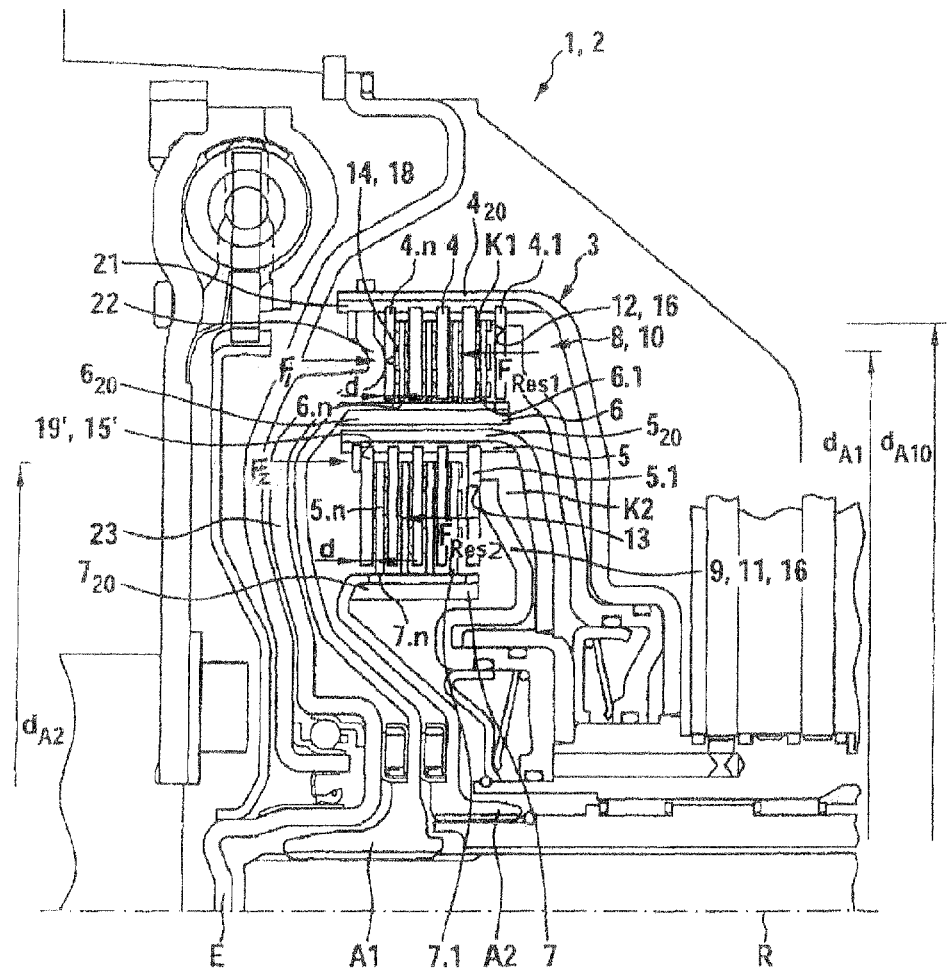
FIG. 1 illustrates in simplified schematic form, using an axial section, a first embodiment of a central support for the actuating force in accordance with the invention.

FIG. 1 uses a detail from an axial section of a clutch arrangement 1, in particular a wet-running dual clutch arrangement 2, to illustrate the configuration of an actuating unit 3 embodied in accordance with the invention. The clutch arrangement 1, in particular the wet-running dual clutch arrangement 2, comprises an input E and two outputs A1, A2 and two clutch arrangements K1 and K2 arranged between them, which are arranged one inside the other in a radial direction and without an offset or with only a slight offset with respect to each other in an axial direction. This allows a very space-saving arrangement of two clutch arrangements K1 and K2, by means of which different transmission input shafts can be coupled to an engine. Each of the clutch arrangements, the first clutch arrangement K1 and the second clutch arrangement K2, comprises a first clutch part 4 and 5 and a second clutch part 6 and 7 respectively, which can be brought into operative connection with one another by means of respective actuating devices 8 and 9. The input E is connected to the first clutch part 4 in an at least indirect, but preferably direct, rotatably fixed manner, while the second clutch part 6 of the first clutch arrangement K1 is connected to an output A1 in an at least indirect, rotatably fixed manner, and is preferably connected to the output A1 in a direct, rotatably fixed manner. These statements apply analogously also to the second clutch arrangement K2. Here, a first clutch part 5 is coupled in a rotatably fixed manner to the input E, while the second clutch part 7 is coupled in a rotatably fixed manner to the output A2. In the case of embodiments of the individual clutch components 4, 5 and 6, 7 of disk-type design, preferably plate-type design, the operative connection is produced by frictional engagement between the alternately arranged plates of the individual clutch parts by pressing the two clutch parts 4, 6 and 5, 7 against one another. In this process, the actuating devices 8 or 9 exert a force on the two clutch parts 4, 6 or 5, 7, respectively, leading to the production of the frictional engagement. For this purpose, each of the clutch parts 4, 6 or 5, 7, respectively, of the individual clutch arrangements K1 and K2 has at least one element, preferably a plurality of elements, which have a surface for the formation of a friction pairing, in particular friction-surface-bearing elements 4.1 to 4.n, 5.1 to 5.n, 6.1 to 6.n and 7.1 to 7.n. Here, the term "friction-surface-bearing elements" is understood to mean a disk-shaped element in the form of a plate, for example, the friction surface forming the surface that forms a friction pairing with another surface of the other clutch part. At least one of the surfaces participating in a friction pairing is embodied specifically as a friction surface and bears a friction lining, for example, while the counterplate is composed of steel, for example, part of its face acting as a friction surface. In the simplest case, the actuating devices 8 and 9 comprise piston elements 10 or 11, respectively. The piston element 10, 11 has an effective pressure surface 12 or 13, which comes into effect at least indirectly on one of the two clutch parts 4, 6 or 5, 7, respectively. The piston element 10 or 11 preferably comes into effect on a friction-surface-bearing element of the first or second clutch part 4, 6 or 5, 7, in this case a first piston-side plate 4.1 or 5.1 of the first clutch part. Here, the effective pressure surface 12, 13 forms that surface of the piston element 10, 11, on its face 16 or 17 aligned in the direction of the clutch arrangement K1 or K2, which comes into effect and engages on one of the clutch parts 4 or 6, 5 or 7 for the purpose of exerting contact pressure, in particular rests against the first piston-side plate, in this case 4.1 or 5.1, for the purpose of producing the operative connection and, owing to the resulting actuating force $F_{Res1}$ for the first clutch arrangement K1 and $F_{Res2}$ for the second clutch arrangement K2, brings the two clutch parts 4, 6 or 5, 7 into operative connection with one another and produces the frictional engagement. The effective piston force is supported against a support surface 14, 15', which is situated opposite the piston element 10, 11 and serves to support what is referred to as the end plate. The piston-side plate and the end plate are preferably formed on the same clutch part. An embodiment in which they are arranged on different clutch parts would also be conceivable. The support surface 14, 15' is a surface on one of the clutch parts 4, 6 or 5, 7, respectively, which form a stop for the friction-surface-bearing elements, which are mounted on a carrier in a rotatably fixed but axially movable manner. This stop is denoted by 18 or 19', respectively, for the individual clutch arrangements K1, K2. The support surface 14 of clutch arrangement K1 is arranged in such a way that it is arranged centrally with respect to the friction surface of the end plate 4.n and the resulting supporting force $F_{Abstütz1}$ and the actuating force $F_{Res1}$ lie, if possible, on a common radial diameter $d_{A1}$ for the first clutch arrangement K1. FIG. 1 illustrates a support solution according to the invention only for clutch arrangement K1, while the support for the piston force on the second clutch arrangement K2 corresponds to the prior-art embodiment for the sake of comparison. Here, the resulting actuating force $F_{Res2}$ for the second clutch arrangement K2 acts on a different diameter than the supporting force $F_{Abstütz2}$ due to the eccentrically arranged stop 19'. The stop 19' is arranged in the region of the outer circumference of the end plate 5.n. The resulting actuating force and the supporting force on the second clutch arrangement K2 are offset relative to one another in a radial direction and result in bending stress on the end plate 5.n of the second clutch arrangement K2. In the first clutch arrangement K1, the force is supported without a radial offset with respect to the resulting actuating force $F_{Res1}$ introduced but is preferably supported directly on a common diameter.

Each of the clutch parts, the first clutch part and the second clutch part 4, 6 or 5, 7, respectively, preferably comprises a plurality of plates. Depending on the arrangement, this is an outer-plate arrangement or an inner-plate arrangement on the first clutch part, and an inner-plate arrangement or an outer-plate arrangement on the second clutch part. For this purpose, the clutch parts 4, 6 or 5, 7 comprise plate carriers $4_{20}$ for the first clutch part 4, $5_{20}$ for the first clutch part 5 of the second clutch arrangement K2, $6_{20}$ for the second clutch part of the first clutch arrangement K1, and $7_{20}$ for the second clutch part 7 of the second clutch arrangement K2. The effective support surface 14 or 15' is preferably formed by the plate carrier $4_{20}$ to $7_{20}$ or at least by an element connected in a rotatably fixed manner to said carrier. In the embodiment shown in FIG. 1, only the means of support in the first clutch arrangement K1 is implemented, as already explained. The effective support surface 14 for the clutch arrangement K1 is formed by the outer-plate carrier $4_{20}$. For this purpose, this carrier, which simultaneously forms a driver unit 21, has a bead 22, which runs around in a circumferential direction, extends as far as the first clutch part 4 in an axial direction and forms the support surface 14 for the last plate, referred to as the end plate 4.n. This support surface 14 is arranged effectively opposite the effective pressure surface 12, with the result that the resulting forces in a radial direction are without an offset relative to one another. According to the invention, the end plate 4.n is embodied with the same or significantly less thickness d as/than the other plates since it is now only designed with a view to the required heat capacity and is no longer designed primarily with a view to its elastic properties for the purpose of supporting the actuating force. The thickness of the end plate 4.1 is also less than in the prior-art embodiment, as illustrated for the clutch arrangement K2. Here, the actuating force is supported eccentrically on the stop 19', and the plate is therefore correspondingly thicker owing to the resulting bending stress.

FIG. 1 illustrates an embodiment with a piston element 10, 11 which can be moved in an axial direction and is mounted on the piston hub, the piston element 10, 11 being embodied as an appropriately shaped disk-shaped element and forming the effective pressure surface 12 in the region of its outer circumference $d_{A10}$. Here, the support surface 14 is formed by a wall part 23 of the plate carrier $4_{20}$. This is a component part of the driver unit 21. It can be seen from this that the outer plates, in particular plate 4.1, which comes into direct contact with the piston element 10, in particular the effective pressure surface 12, and the end plate 4.n, which comes into direct contact with the support surface 14, are each embodied with a small width. The intermediate plates 4.2 to 4.n−1 are designed to be thicker and in accordance with the heat capacity, while the two end plates, the piston-side end plate 4.1 and the end plate 4.n on the support-surface side, are embodied with only a relatively small thickness. This makes it possible to make the outer clutch arrangement significantly shorter in an axial direction in the case illustrated, this being implemented in the shaping of the driver subassembly 21, in particular of the element which is connected in a rotatably fixed manner to the outer-plate carrier $4_{20}$ or forms the latter.

FIG. 1 illustrates an embodiment in which this is implemented only for the radially outer clutch arrangement K1, but it is also conceivable to implement the same arrangement also for the second clutch arrangement K2. The statements made in relation to clutch arrangement K1 also apply to K2 if the support surface is arranged in accordance with the invention.

Figure 2:
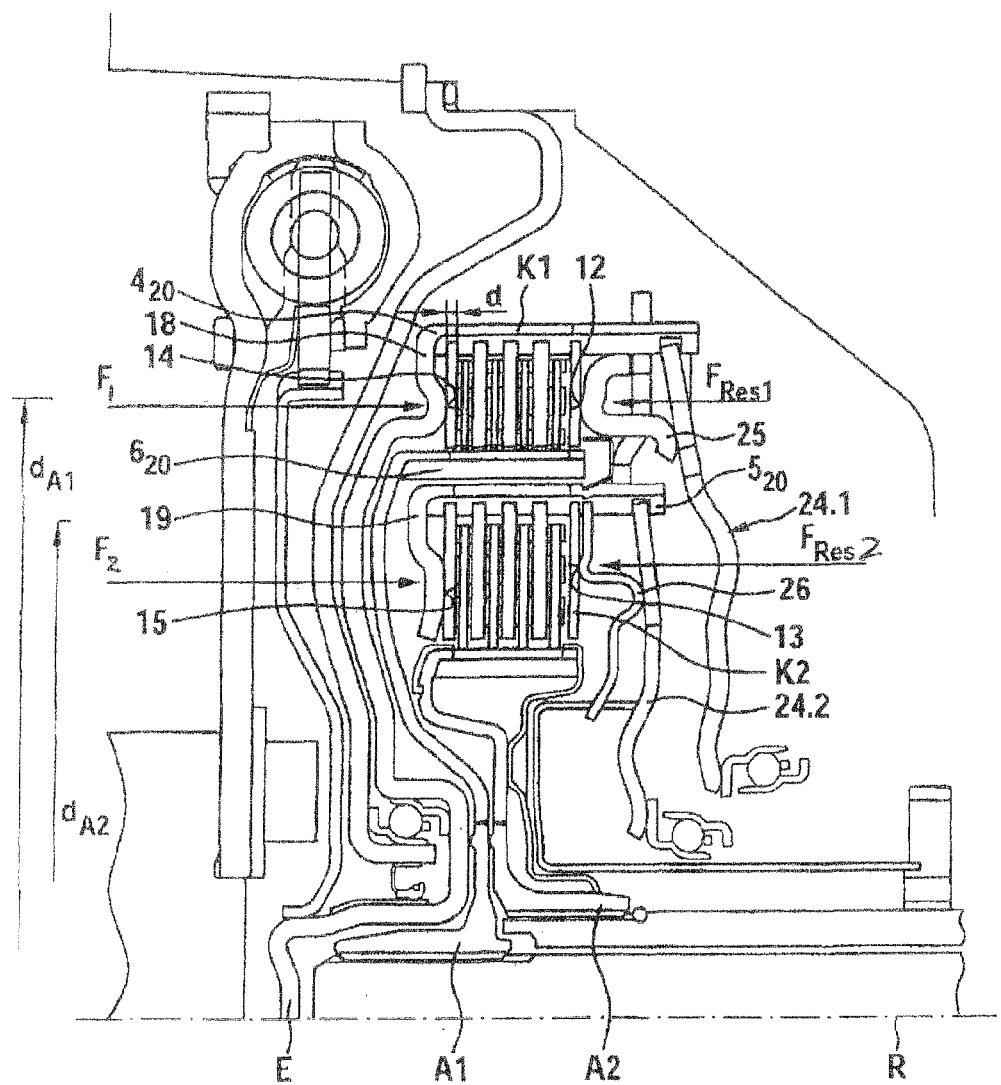
FIG. 2 illustrates an alternative embodiment of an actuating device for a dual clutch arrangement in accordance with FIG. 1.

FIG. 2 illustrates by way of example an embodiment of a clutch arrangement 1 in which both clutch arrangements K1 and K2 have been modified as regards the actuation and alignment of the effective pressure surfaces 12, 13 and of the support surfaces. The basic construction of the clutch parts 4, 5, 6, 7 corresponds to that described in FIG. 1. Here, however, the stop 19 forming the support surface 15 on the second clutch arrangement K2 has been formed by the outer-plate carrier $5_{20}$. Here, the support surface is likewise arranged centrally with respect to the surface of the end plate 5.n to ensure uniform surface pressure. The elements which produce the contact force are here designed as plate springs 25, 26. The pressure surfaces 12, 13 formed on the faces of the plate springs are actuated by means of a kind of lever mechanism 24.1, 24.2. The pressure surface 12, 13 itself on the plate spring is embodied in such a way that, when subjected to force by way of the lever mechanism 24.1, it acts against the respective piston-side end plate 4.1 or 5.1 of the corresponding clutch part 4, 5, in this case, in particular, the outer plates and hence the clutch parts 4, 5. Here too, the outer-plate carriers are embodied in a corresponding fashion, thus forming a support surface 14 or 15 for the respective end plates 4.n, 5.n of the individual clutch arrangements K1 and K2. The individual support surface 14, 15 is arranged in such a way that it forms a central support for the possible plate friction surface, and thus produces the resulting counterforce $F_{Abstütz1}$ for the first clutch arrangement K1 and $F_{Abstütz2}$ for the second clutch arrangement K2 to the resulting actuating force $F_{Res1}$ for the first clutch arrangement K1 and $F_{Res2}$ for the second clutch arrangement K2, and the lines of force of the resulting forces lie virtually on a radius or diameter $d_{A1}$, $d_{A2}$. It is apparent here for both clutch arrangements K1 and K2 that the end plates 4.n or 5.n, respectively, are each thinner than the intermediate plates 4.2 to 4.n−1, 6.1 to 6.n and 5.2 to 5.n−1, 7.1 to 7.n, respectively, owing to the central support. Here too, the thickness of the end plate is in a range of from 1.5 to 2.5 mm.

The support surfaces 14, 15 are arranged in the central surface area of the effective friction surfaces of the outer and inner plates. This makes it possible to bring about uniform support of the actuating force applied by the piston elements 10 or 11 to the individual clutch parts 4, 6 or 5, 7, respectively. The central support makes it possible to reduce the thickness of the last element of the first or second clutch parts 4, 6 or 5, 7, respectively, said element being supported in the support surface 14 or 15. The reduction is accomplished by making these end plates thinner than the other intermediate plates, thereby making it possible to reduce the overall axial length and save costs, to make an overall reduction in the maximum temperatures in the region of frictional contact while keeping the overall axial length of the plate assembly the same and to increase the life of the lining or friction surface and of the transmission oil.

The effective pressure surfaces 12 and 13 and the support surfaces 14 or 15, respectively, are placed directly opposite one another when viewed in an axial direction, that is, they face one another and are furthermore preferably without an offset in a radial direction relative to one another. Furthermore, the effective pressure surfaces 12, 13 and support surfaces 14, 15 are arranged centrally relative to the effective surface of the clutch parts 4, 6 or 5, 7, respectively, which can be brought into operative connection with one another, in particular of the respective end plate 4.n and 5.n.

FIG. 3 once again illustrates a detail of FIG. 2 relating to the actuating mechanism for the clutch arrangement K1, as a detail on an enlarged scale.

LIST OF REFERENCES

1 Clutch arrangement
2 Wet-running dual clutch
3 Actuating device
4 First clutch part
4.1-4.n Plates
5 First clutch part
5.1-5.n Plates
6 Second clutch part
6.1-6.n Plates
7 Second clutch part
7.1-7.n Plates
8 Actuating device
9 Actuating device
10 Piston element
11 Piston element
12 Effective pressure surface
13 Effective pressure surface
14 Support surface
15, 15' Support surface
16 Face
17 Face
18 Stop
19, 19' Stop
$4_{20}$ Plate carrier
$5_{20}$ Plate carrier
$6_{70}$ Plate carrier
$7_{20}$ Plate carrier
21 Driver unit
22 Bead
23 Clutch part
24 Lever mechanism
25 Plate spring
26 Plate spring
$F_{Res1}$ Resulting actuation of the counterforce
$F_{Res2}$ Resulting actuating force
$F_{Abstütz1}$ Resulting supporting force
$F_{Abstütz2}$ Resulting supporting force
$d_{41}$, $d_{42}$ Diameter
E Input
A1, A2 Output
K1 First clutch arrangement
K2 Second clutch arrangement
d Thickness
$d_{A10}$ Outer circumference

The invention claimed is:

1. A clutch arrangement, comprising:
a first clutch part and a second clutch part, the first clutch part having friction-surface-bearing elements including a first outer plate, a second outer plate and intermediate plates, the second clutch part having friction-surface-bearing element including intermediate plates alternatingly arranged with the friction-surface-bearing elements of the first clutch part, the intermediate plates of the first clutch part and of the second clutch part are surrounded on one side by the first outer plate and on another side by the second outer plate, the first outer plate and the second outer plate each have a thickness which is less than a thickness of each of the intermediate plates of the first clutch part and the second clutch part;
an element having a support surface which aids in supporting the friction-surface-bearing elements; and
an actuating device having a pressure element with an effective pressure surface spaced from, opposing and aligned with the support surface such that an actuating force can be exerted by the actuating device on the friction-surface-bearing elements of first clutch part and the second clutch part to bring the first clutch part and the second clutch part into operative connection with each other.

2. The clutch arrangement of claim 1, wherein the support surface is arranged centrally with respect to a friction surface of one of the friction-surface-bearing elements which contacts the support surface.

3. The clutch arrangement of claim 1, further comprising a carrier for the friction-surface-bearing elements of the first clutch part and the second clutch part, the friction-surface-bearing elements form one surface of a friction pairing, and the support surface is formed on the carrier or an element coupled in a rotationally rigid manner to the carrier.

4. The clutch arrangement of claim 3, wherein the support surface is formed by a projection free from interruptions in a circumferential direction on the element forming the support surface.

5. The clutch arrangement of claim 4, wherein the projection is a bead.

6. The clutch arrangement of claim 1, wherein the first clutch part has a carrier which is a component part of a driver unit that can be coupled to an engine, and the support surface is formed by the driver unit or by an element coupled in a rotationally rigid manner to the driver unit.

7. The clutch arrangement of claim 1, further comprising a housing with the support surface formed on the housing or by a housing part.

8. The clutch arrangement of claim 1, wherein the support surface lies opposite the effective pressure surface when viewed in an axial direction in such a way as to be without an offset in a radial direction.

9. The clutch arrangement of claim 1, wherein the support surface is larger than the effective pressure surface.

10. The clutch arrangement of claim 1, wherein the support surface is smaller than or equal to the effective pressure surface.

11. The clutch arrangement of claim 1, wherein the effective pressure surface corresponds to a size of friction surfaces.

12. The clutch arrangement of claim 1, wherein the pressure surface is formed by a piston element.

13. The clutch arrangement of claim 1, wherein the pressure surface is formed by a diaphragm spring which can be preloaded by means of a lever mechanism.

14. A dual clutch arrangement, comprising:
at least one input;
two outputs;
a first clutch arrangement; and
a second clutch arrangement, the first clutch arrangement and the second clutch arrangement being arranged coaxially with one another and one inside the other in a radial direction, each comprising a first clutch part, which can be coupled to an input or forms the input, and a second clutch part, which can be coupled to one output in each case, which clutch parts can be brought into operative connection with one another by means of an actuating device,
wherein at least the first clutch arrangement is constructed in accordance with claim 1.

15. A dual clutch arrangement, comprising:
at least one input;
two outputs;
a first clutch arrangement; and
a second clutch arrangement, the first clutch arrangement and the second clutch arrangement being arranged coaxially with one another and one inside the other in a radial direction, each comprising a first clutch part, which can be coupled to an input or forms the input, and a second clutch part, which can be coupled to one output in each case, which clutch parts can be brought into operative connection with one another by means of an actuating device,
wherein both the first clutch arrangement and the second clutch arrangement are constructed in accordance with claim 1.

16. The clutch arrangement of claim 1, wherein the thickness of the first outer plate and the second outer plate each corresponds to 85% of a thickness of the intermediate plates.

17. The clutch arrangement of claim 16, wherein the thickness of the first outer plate and the second outer plate each corresponds to 90% of the thickness of the intermediate plates.

* * * * *